July 18, 1961 E. W. JACKSON 2,992,432
OPTICAL DEVICES

Filed June 5, 1959 2 Sheets-Sheet 1

INVENTOR.
ELLISON W. JACKSON,
BY
McMorrow, Berman & Davidson
ATTORNEYS.

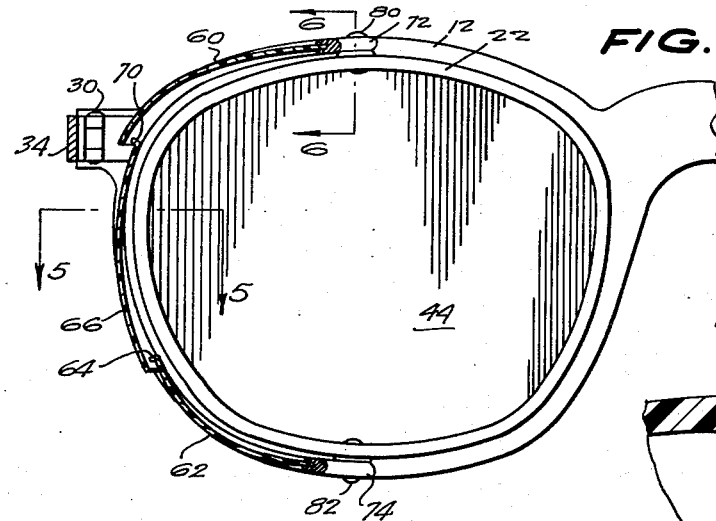

United States Patent Office 2,992,432
Patented July 18, 1961

2,992,432
OPTICAL DEVICES
Ellison W. Jackson, 644 Broadway, Gary, Ind.
Filed June 5, 1959, Ser. No. 818,422
4 Claims. (Cl. 2—14)

This invention relates to the general class of optical devices and, more specifically, the invention pertains to safety glasses or goggles.

Those skilled in the art of the manufacture of safety glasses are quite conversant with at least two major complaints registered against such equipment presently available on the open market, for example, the safety glasses when worn by the user constantly tend to fog, and that side vision is obscured due to the presence of the usual apertures formed in the side shields, scratching, and other causes too well known to be further enumerated herein.

The fogging of the glasses and the reduction or complete elimination of side vision contributes directly to physical injuries of the users since he is normally not aware of an approaching threat to his person.

It is, therefore, one of the primary objects of this invention to provide non-fogging safety glasses.

Another object of this invention is to provide safety glasses equipped with transparent side shields to permit a maximum of side vision.

A further object of this invention is to provide unique venting means to the interior of the glasses when worn by the user.

Still another object of the invention is to provide double lens safety glasses with a dead air space therebetween as a further means for preventing fogging of the glasses.

Yet another object of this invention is to provide double lens safety glasses with a dead air space therebetween and wherein at least one of the lenses is of the snap in replaceable plastic type.

As a further object of this invention it is proposed to provide in safety glasses, side shields therefor wherein each of the side shields is formed of a plurality of individual separate panels formed of transparent material and wherein adjacent sides of the panels are disposed in overlapped, spaced relation relative to each other to provide an air passage therebetween.

This invention proposes, still further, to provide safety glasses with side shields of the type generally described supra, wherein at least one of the overlapped sides of the panels is formed with outwardly turned dust and debris catching flanges.

A still further object of this invention is to provide in a safety glass side shield formed of a plurality of transparent panels, means for permitting the removal of at least one of the panels and the replacement thereof.

This invention contemplates, as a still further object thereof, the provision of safety glasses or goggles which are non-complex in construction and assembly, inexpensive to manufacture and maintain and which are durable in use.

Other and further objects and advantages of the instant invention will become more evident from the following specification when read in the light of the annexed drawings, in which:

FIGURE 4 is a detail fragmentary cross-sectional view, FIGURE 4 being taken on the horizontal plane of line 4—4 of FIGURE 1, looking in the direction of the arrows and/or on the vertical plane of line 4—4 of FIGURE 3, looking in the direction of the arrows;

FIGURE 5 is an enlarged detail cross-sectional view taken substantially on the horizontal plane of line 5—5 of FIGURE 4, looking in the direction of the arrows;

FIGURE 6 is an enlarged fragmentary detail cross-sectional view taken substantially on the vertical plane of line 6—6 of FIGURE 4, looking in the direction of the arrows;

FIGURE 7 is a fragmentary perspective view illustrating the shield portion of the safety glasses pivoted away from its operative position as illustrated in FIGURE 3; and FIGURE 8 is a fragmentary perspective view of the safety glasses constructed in accordance with a second embodiment thereof.

Figure 1:
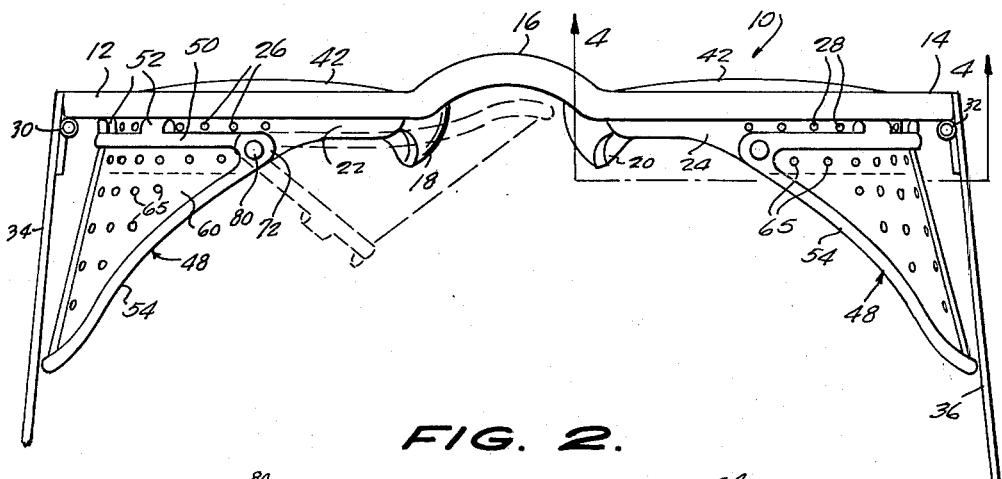
FIGURE 1 is a top plan view of a pair of safety glasses constructed in accordance with the instant invention.

Referring now more specifically to the drawings, reference numeral 10 designates, in general, safety glasses or goggles constructed in accordance with the teachings of this invention. The glasses 10 are seen to comprise a pair of lens frames 12, 14 formed of a plastic or other suitable material interconnected by a nose bridge 16, all in the conventional manner, and including nose-engaging side pieces 18, 20. Each of the frames 12, 14 is integrally formed with rearwardly extending inwardly offset peripheral flanges 22, 24, respectively, each being provided with a plurality of apertures 26, 28 extending transversely therethrough at peripherally spaced intervals. To the remotely disposed sides of the lens frames 14, 12 are hingedly connected at 30, 32 one of the ends of a pair of conventional temple pieces 34, 36.

Each of the lens frames 12, 14 are formed with a plurality of spaced peripheral grooves 38, 40 (only one pair being shown), the grooves 38 receiving therein safety lenses 42 (see FIGURES 1, 5 and 6). The safety lens 42 may be clear, colored and/or corrective if desired. The grooves 40 receive therein relatively thin resilient transparent plastic snap-in lenses 44.

As will be understood from the aforedescribed frame structure, the lens frames 12, 14 and the lenses 42, 44 cooperate to form a dead air space 46 therebetween.

Figure 3:
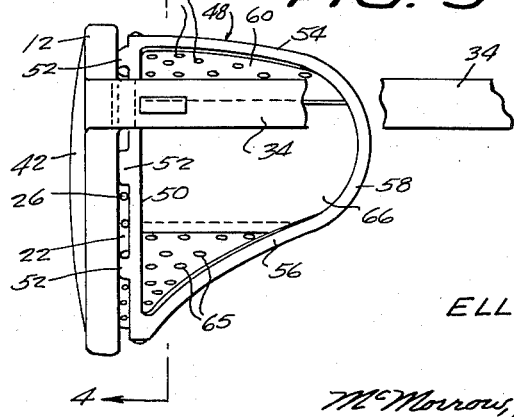
FIGURE 3 is a fragmentary side elevational view of the safety glasses shown in FIGURES 1 and 2.

The side shields of the safety glasses 10, denoted at 48 are identical in construction with the exception that they are of opposite hand and hence a description of one is a description of the other. Thus, each shield 48 comprises a substantially semi-circular rib 50 normally disposed in its forward or operative position, as illustrated in FIGURES 1 and 3, the rib 50 being integrally connected with a plurality of forwardly projecting lugs or stop members 52 which serve a function to be described. As is seen in the drawings, the lugs 52, when the rib 50 is in its forward position, engage against the frames 12, 14 in order to space the rib 50 in juxtaposed position therefrom.

The ends of the rib 50 are integrally connected to one of the ends of a pair of arms 54, 56 of an outwardly bowed support including a bight element 58 integrally connecting the other ends of the arms 54, 56. The arms 54, 56 and the bight 58 comprise face engaging portions of the shields 48.

Figure 2:
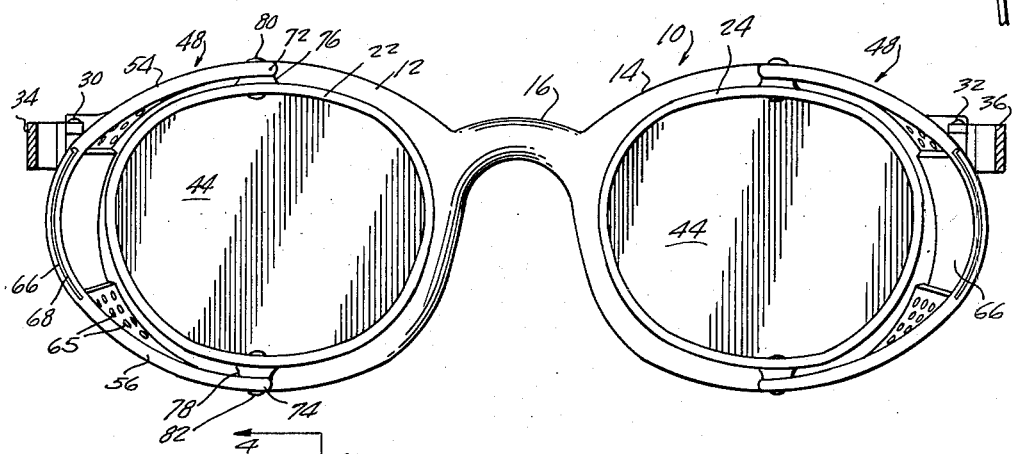
FIGURE 2 is a back or rear elevational view of the glasses illustrated in FIGURE 1.

Each of the shields 48 includes a substantially triangular side shield panel 60 formed of a transparent plastic and arcuately shaped in transverse cross-section (see FIGURE 4) and is secured by conventional means between the arm 54 and an adjacent arcuate portion of the rib 50. In a similar manner, a second side shield panel 62 extends between and is secured to the arm 56 and an adjacent arcuate portion of the rib 50. As is clearly seen in FIGURE 4, the upper longitudinally extending side of the panel 62 is formed with an outwardly turned flange 64 to serve a purpose to be described. The panels 60, 62 are each formed with a plurality of apertures 65 which extend transversely therethrough. Extending between the bight 58 and the opposed adjacent side of the rib 50 is a third transparent plastic panel 66 having a substantially rectangular configuration and being also arcuate in transverse-section. This panel is preferably slidably mounted through a slot 68 extending through the bight 58 (see FIGURE 2). As is clearly seen in FIGURE 4, the upper side of the panel 66 terminates in an outwardly turned flange 70 which is overlapped by the lower side of the panel 60 to form an air space therebetween. Similarly, the lower edge of the panel 66 overlaps the flange 64 to form a second air space therebetween.

At the junctures of the arms 54, 56 with the rib 50 at points 72, 74, the same are pivotally connected to the flanges 22, 24 over bosses 76, 78 by means of pivot pins 80, 82. The hinge or pivotal connection permits the shields 48 to be pivoted or folded inwardly to the dotted line or inoperative position shown in FIGURE 1 to facilitate the carrying thereof.

The bosses 76, 78 together with the lugs 52 serve to hold the rib 50 in substantially spaced relation relative to the flanges 22, 24 providing an air passage therebetween, and further, the lugs 52 prevent the rib 50 from overlapping the apertures 26 which, taken together with the apertures 65 serve as additional air passages.

The lens 44, as has been described above, is relatively thin with respect to the thickness of the safety lens 42 and is sufficiently flexible as to permit the same to be snapped-in in the groove 40 to provide the dead air space 46. FIGURE 6 of the drawings shows this construction with the spacing and thicknesses of the lensses 42, 44 being greatly exaggerated. This feature taken with the provision of the clear panel 66 and the several air venting provisions prevent the glasses 10 from fogging and provide the wearer with the maximum of side view vision. The lenses 44 as well as the panels 66 are removable whereby the same may be replaced in the event they should crack, become scarred or scratched.

FIGURE 8 illustrates a second embodiment of this invention wherein elements thereof which find their counterparts in the original modification have been assigned identical reference numerals. The essential differences between the two embodiments of this invention reside in that the latter embodiment does not employ the lugs 52, but in lieu thereof spacer members 100 are formed integral with the flange 22 and extend transversely thereof at peripherally spaced intervals. The flanges 100 are also integral with stops or lugs 102 which are integral with the lens frames 12, 14.

In all other respects the two embodiments of this invention are identical.

It will be now readily apparent that the flanges 100 when engaged by the rib 50 hold the same in spaced relation relative to the flanges 22, 24 to provide an air passage therebetween, and that the stop members or lugs 102 prevent the rib 50 from overlapping and closing the apertures 26.

Having described and illustrated two embodiments of this invention, it will be understood that the same are offered merely by way of example, and that this invention is to be limited only by the scope of the appended claims.

What is claimed is:
1. Safety glasses including a pair of lens frames and a side shield for each of said frames, said frames each having a peripheral flange projecting laterally from a side thereof, each of said flanges having a plurality of peripherally spaced apertures extending transversely therethrough adjacent said frames, each of said flanges having integrally formed therewith at spaced peripheral intervals a plurality of spacer members projecting laterally and outwardly therefrom, and each of said frames having integrally formed therewith a plurality of lugs, a side shield for each of said frames, each of said shields comprising a substantially semi-circular rib, an arm, the ends of which are integral with each end of said rib, said arm including a bight portion intermediate its ends, a substantially triangular plastic panel fixedly secured to one of said arms and adjacent portions of said rib, a second substantially triangular plastic panel fixedly secured to the other of said arms and adjacent portions of said rib, and a third substantially rectangular panel formed of plastic material extending between said bight and the opposed portion of said rib, said first and second panels each having a plurality of apertures extending transversely therethrough.

2. A side shield for safety glasses comprising a substantially semi-circular rib, an arm, the ends of said arm being integral with each end of said rib, said arm including a bight portion intermediate the ends of said arm and being spaced laterally from said rib, a substantially triangular pair of panels formed of transparent material secured to said arm in vertically-spaced relation and to adjacent portions of said rib, a third substantially rectangular transparent panel interposed between said first panels and extending between said bight and an opposed portion of said rib, said triangular panels being provided with a plurality of apertures extending transversely therethrough, all of said panels being arcuately shaped in transverse cross-section, and means disposed in said bight portion slidably receiving said third transparent panel therethrough to permit replacement thereof.

3. Safety glasses including a pair of lens frames and a side shield for each of said frames, said frames each having a peripheral flange projecting laterally from a side thereof, each of said flanges having a plurality of apertures extending transversely therethrough adjacent said frames, a side shield for each of said frames, means holding said shields in spaced relation relative to said flanges, each of said shields comprising a substantially semi-circular rib and an arm integral with each end of said rib, said arm projecting laterally from said rib and having a bight portion intermediate the ends thereof, a first substantially triangular plastic panel fixedly secured to said arm and adjacent portions of said rib, a second triangular plastic panel fixedly secured to said arm and adjacent portions of said rib in vertically-spaced relation relative to said first panel, a third substantially rectangular panel formed of plastic material extending between said bight and the opposed portion of said rib, said first and second panels each having a plurality of apertures extending transversely therethrough, said panels all being formed of a transparent plastic material, said first panel having a side overlapping a side of said third panel in spaced relation relative thereto, and said third panel having a side overlapping a side of said second panel in spaced relation relative thereto.

4. Safety glasses as defined in claim 3, wherein said overlapped end of said third panel is provided with a longitudinally-extending outwardly-turned flange, and said overlapped end of said second panel is also provided with a longitudinally-extending outwardly-turned flange.

References Cited in the file of this patent
UNITED STATES PATENTS

| | | |
|---|---|---|
| 2,130,127 | Fischer | Sept. 13, 1938 |
| 2,300,365 | Wagner | Oct. 27, 1942 |
| 2,773,260 | Hirschmann | Dec. 11, 1956 |
| 2,907,041 | Finn | Oct. 6, 1959 |

FOREIGN PATENTS

| | | |
|---|---|---|
| 561,597 | Canada | Aug. 12, 1958 |